SLOT-VECTOR DIAGRAM FOR ONE PHASE OF A 3-PHASE WINDING IN 36 SLOTS.

SLOT-VECTOR DIAGRAM FOR ONE PHASE OF A 3-PHASE WINDING IN 54 SLOTS.

Fig. 2A.

SLOT NOS. 1 2 3 4 5 6 7 8 9 10 11 12 13 14 15 16 17 18 19 20 21 22 23 24 25 26 27 28 29 30 31 32 33 34 35 36
↓ PHASE A ORIGIN                       ↓ PHASE B ORIGIN                          ↓ PHASE C ORIGIN
A A A A A-C-C-C-C-B B B B B-A-A-A-A-A-C C C C C-B-B-B-B-B-B
COIL GROUP SEQUENCE: 6 — 6 PER PHASE.

Fig. 2B.

↓ PHASE A ORIGIN                     ↓ PHASE C ORIGIN                       ↓ PHASE B ORIGIN
A-C-C B-A C-B A A A-C B-A C-B A-C C-B A-C B-A C-B A-C B-A-A C-B A-C B B-A C-B
COIL GROUP SEQUENCE: 1-1-2-1-1——1-1-2-1-1 PER PHASE

Fig. 6.

PHASE B ORIGIN ↓ PHASE A ORIGIN    ↓PHASE C ORIGIN PHASE A AXIS
-B-B-B-B A A A-C-C C B B B-A-A-A-A-A↓A-A-A C C C C-B-B-B-B A A A-C-C-C-C
COIL GROUP SEQUENCES: 3-6-3-3-6-3    FOR PHASE A
                     5-4-3-5-4-3    FOR PHASE B
                     3-4-5-3-4-5    FOR PHASE C

SLOT-VECTOR DIAGRAM FOR ONE HALF-PHASE OF A 3-PHASE WINDING IN 72 SLOTS.

SLOT-VECTOR DIAGRAM FOR ONE HALF-PHASE OF A 3 PHASE WINDING IN 96 SLOTS.

TABLE I

| Slot-Vector Nos. | Component e.m.f. along Vertical Axis | Component e.m.f. along Horizontal Axis |
|---|---|---|
| 1 AND 1' | $\cos(-25)° = .90631$ | $\sin(-25)° = -.42262$ |
| 2 AND 2' | $\cos(-15)° = .96593$ | $\sin(-15)° = -.25882$ |
| 3 AND 3' | $\cos(-5)° = .99619$ | $\sin(-5)° = -.08716$ |
| 4 AND 4' | $\cos 5° = .99619$ | $\sin 5° = .08716$ |
| 5 AND 5' | $\cos 15° = .96593$ | $\sin 15° = .25882$ |
| 6 AND 6' | $\cos 25° = .90631$ | $\sin 25° = .42262$ |
| RESULTANT e.m.f. | $11.47372 e^{j0°}$ | |
| 1/3 (RESULTANT e.m.f.) (IDEAL VALUE) | $3.82457 e^{j0°}$ | |

SLOT-VECTOR DIAGRAM FOR ONE PHASE OF
A 3-PHASE WINDING IN 90 SLOTS

United States Patent Office 3,515,922
Patented June 2, 1970

3,515,922
ALTERNATING CURRENT ELECTRIC MOTOR WITH MULTIPLE PARALLEL CIRCUITS WINDING AND METHOD OF WINDING
William Fong, Westbury-on-Trym, Bristol, England, assignor to The National Research Development Corporation, London, England, a British corporation
Filed July 12, 1968, Ser. No. 744,495
Claims priority, application Great Britain, July 20, 1967, 33,417/67
Int. Cl. H02k 3/28, 15/085
U.S. Cl. 310—198
8 Claims

ABSTRACT OF THE DISCLOSURE

Alternating current electric motors (single-phase, three-phase or polyphase) particularly medium or large low-voltage machines, with multiple parallel circuits per phase, using standard frames. A standard slot-number is chosen providing the same plurality of coils (or coil groups) for every phase. Individual coils are selected for connection in series or parallel with one another, in either direct or reverse connection, so that voltage vectors of parallel-connected coil groups differ by not more than 6%. The windings may be three phase double layer with three to six parallel circuits per phase. However, the method is applicable to single phase and other polyphase windings.

---

This invention relates to rotary electric machines, particularly to alternating current electric motors.

The object of the invention is to provide alternating current electric motors, particularly medium and large size low-voltage machines, of improved design by the use of armature windings having multiple parallel circuits per phase.

Particularly, the object of the invention is attained, for single-phase, three-phase or polyphase machines, while using standard frames with commonly-used slot numbers.

It is known to be possible to use two parallel circuits per phase for a three-phase or a single-phase winding, whatever its pole number, provided the winding is accommodated in an armature of even slot-number. Where integral-slot windings are used, a number (A) of parallel circuits per phase equal to the number of pole-pairs ($p$), or the pole-number ($2p$), is permissible. The quantity ($2p/A$) is thus always an integer. Intermediate numbers of parallel circuits per phase and numbers of parallel circuits greater than the pole-number, for which ($2p/A$) is not an integer, have hitherto been supposed unattainable.

The present invention provides a method of constructing an alternating current motor winding (single-phase, three-phase or polyphase) having a plurality (A) of parallel circuits per phase comprising:

(1) Selecting a slotted armature having $S_a$ slots,
where
$$S_a = P \times A \times C$$
where
P=number of phases, and
C=number of coils per circuit;

(2) Winding the armature as a double layer winding throughout;

(3) Ascertaining for each coil the magnitude and relative phase angle of the induced EMF therein;

(4) Selecting each coil for series-parallel combinations subject to the following requirements:

(i) Every coil is connected in one or another series-parallel combination;

(ii) Every series-parallel combination comprises the same total number of coils, the same number (A) of parallel circuits and each parallel circuit has the same number of series-connected coils;

(iii) The expression $2p/A$ (where $2p$ is the pole-number of the machine) is not an integer;

(iv) The vectorial resultants of induced EMF and relative phase angle of all series-connected coil combinations which are connected in parallel with each other differ by not more than 6%;

(v) For the purpose of (iv) above either the relative phase angle ($\theta$) or the opposite phase angle ($\theta+\pi$) may be considered, according to the sense of connection of the particular coil in circuit.

With reference to (1) above, it is to be understood that the number S will normally be determined by selecting a standard frame having a commonly-used slot number.

With reference to (4(iv)) above, it is preferred that the vectorial resultants of EMF and relative phase angle differ by less than 2.5%. A value of less than 1% is often attainable.

An explanation will now be given of the theory which underlies the present invention.

The phase voltage (V) of an alternating current machine may be written in the form $$V = kB_m k_w S\left(Z_s \times \frac{2p}{A}\right) \qquad (1)$$

where:

$k = 1.11\, DLf/p^2$
D=mean air-gap diameter
L=armature core length
$f$=frequency
$p$=number of pole-pairs
$B_m$=maximum air-gap flux density
S=number of slots per phase
$Z_s$=number of conductors per slot
A=number of parallel circuits per phase In theory, with the exception of the phase voltage (V), frequency ($f$) and pole-pairs ($p$), a designer has freedom of choice in all the parameters of Equation 1. In practice, this choice is limited. Since, with a standard frame size ($k$=a constant), the armature slot-number (hence S) is hardly variable, and for a medium or large low-voltage machine, the number of conductors per slot ($Z_s$) is a small even number. The range of variation in the bracketed quantity of Equation 1 is therefore small.

The winding factor ($k_w$) is a measure of the machine rating, and should have the highest value possible. The performance characteristics (power factor, efficiency etc.) depend on a correct choice of the maximum air-gap flux density ($B_m$). Thus, a designer will frequently be faced with the following alternatives:

(a) using a standard frame size, but accepting a value of $B_m$ which is not ideal from the performance viewpoint;
(b) Using a standard frame size, but with a reduction in winding factor (by means of chording) to achieve the desired value of $B_m$; or
(c) Using a non-standard frame size which permits a special armature slot-number (hence S) to give the optimum value of $B_m$.

On the other hand, if the quantity ($2p/A$) may be made to take non-integral values, it becomes possible to achieve a combination of optimum performance and a high winding factor with standard frame sizes. The present invention gives this flexibility in design and provides a variety of multi-parallel-circuit windings.

Multiple parallel-circuit windings according to the invention may be classified as being of three types.

The ideal condition for connecting in parallel a number of circuits of an armature winding is that the E.M.F.'s induced in the individual circuits shall be equal in magnitude and cophasal. In practice, however, marginal deviations from this exact condition is permissible. Indeed, the exact condition is not fulfilled even in standard windings due to manufacturing imperfections, such as magnetic asymmetry, for example.

Thus there are classified three types of multi-parallel circuit windings as follows:

(a) The induced E.M.F.'s in the individual circuits to be paralleled are cophasal, but marginally different in magnitude—(Type M windings)
(b) The induced E.M.F.'s in the individual circuits to be paralleled are equal in magnitude, but differ marginally in (time) phase—(Type PH windings)
(c) The induced E.M.F.'s in the individual circuits to be paralleled differ marginally in magnitude as well as phase—(Type MPH windings)

For convenience, these three types of windings will be referred to herein, respectively, as Type M, Type PH and Type MPH: Their common characteristic is that the pole-number of the winding is not an integral multiple of the number of parallel circuits per phase.

The principle of multi-parallel-circuit windings will be illustrated by reference to three-phase, double-layer windings. Since the lower layer of a double-layer winding is an exact reproduction of the upper layer, but displaced by the amount of the coil-pitch and reversed in sign, it is necessary to consider one layer only.

In order that the invention may be readily carried into practice, the general principle of the invention and a number of embodiments, given by way of example, will now be described in detail with reference to the accompanying drawings, in which:

FIG. 2A is a coil-group distribution diagram for a three-phase, 2-pole winding, to one phase of which FIG. 1 relates;

FIG. 2B is a coil-group distribution diagram for a three-phase, 10-pole winding wound in a 36 slot armature.

FIG. 6 is a coil-group distribution diagram for one half of a three-phase, 6-pole winding wound in a 72 slot armature;

The principle of multi-parallel-circuit windings will be illustrated by reference to three-phase, double-layer windings.

Since the lower layer of a double-layer winding is an exact reproduction of the upper layer, but displaced by the amount of the coil-pitch and reversed in sign, it is necessary to consider one layer only.

The E.M.F.'s induced in the coil-sides of one layer will be represented by "slot-vectors" in the conventional manner.

With the exception of one example, a 6-pole winding, all the windings considered will have an actual or "equivalent" phase-spread of 60°. The spread factor for these windings will therefore be high, being very nearly 0.955 when the number of slot-vectors per 60° spread exceeds "3."

The $n$ slot-vectors spread over 60° will be numbered 1, 2, 3 ... $n$. Where the coil-group sequence of each phase-winding is twice repeatable, the second set of $n$ slot-vectors will be numbered 1′, 2′, 3 ... $n'$. Correspondingly numbered slot-vectors i.e. 1 and 1′; 2 and 2′; etc. will overlap each other in the slot-vector diagram. It should be noted, however, that the numbering for the slot-vectors is not necessarily the same as the numbering of slots in which the coils of a phase-winding lie. The exact correspondence between the numbering of the slot-vectors and the actual slots will be shown later.

The phase band sequence in all cases will be $$\overset{+}{A}\ \overset{-}{C}\ \overset{+}{B}\ \overset{-}{A}\ \overset{+}{C}\ \overset{-}{B}$$

repeated ($p$) times, whatever the coil-group sequence for each phase-winding. For windings whose pole-numbers are not multiples of "3," the three phase-windings start at three points spaced equidistantly around the armature perimeter. The same phase-winding pattern, that is, the coil-group sequence for each phase-winding, is exactly repeatable with respect to the starting points of the phase-windings. In the case of windings of triplen pole-numbers, the coil-group sequences for the three phase-windings are not necessarily identical, and the phase origins are not located at equidistant points around the armature perimeter.

It will be clear, however, that for balanced three-phase windings, whatever their pole-numbers, the slot-vector diagrams of the three phase-windings must be identical, though displaced by 120° with respect to one another. In relation to the slot-vector diagram therefore, it is only necessary to consider one phase-winding.

We consider first an example of multi-parallel-circuit windings having 3 parallel-circuits per phase and of the type MPH defined above.

An obvious requirement for 3 parallel-circuit windings is that the number of slots per phase must be an integral multiple of "3."

Figure 1:
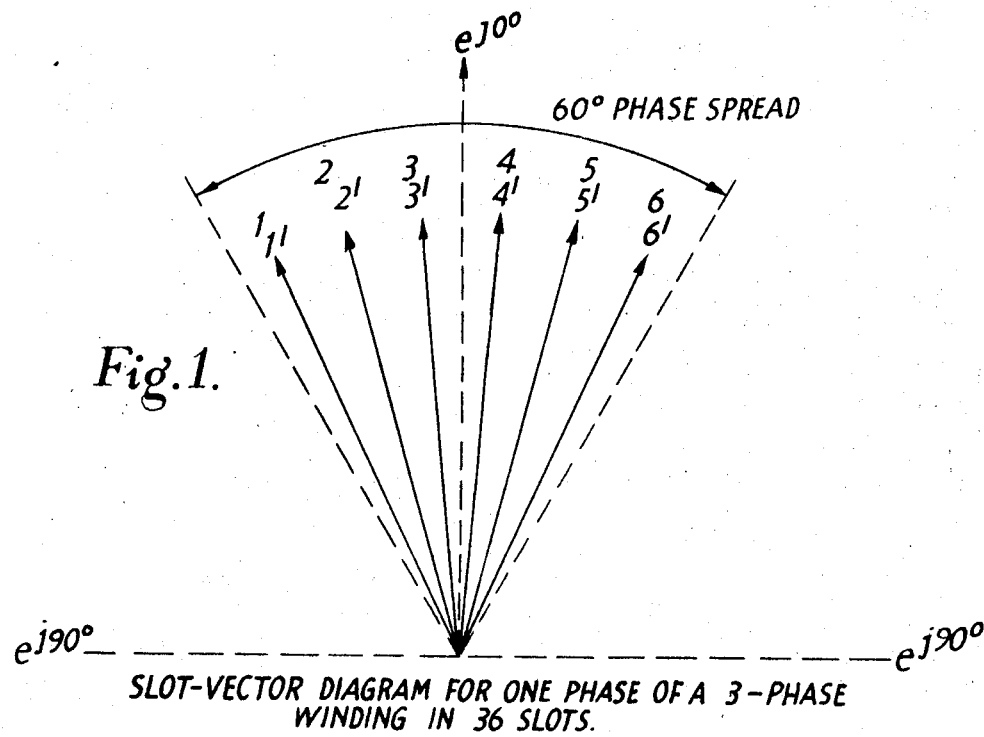
FIG. 1 is a slot-vector diagram for one phase of a three-phase winding wound in a 36 slot armature.

In FIG. 1 is shown the slot-vector diagram for one phase, say, phase A of a 3-phase winding in 36 slots. Such a diagram can represent simply the slot-vector distribution per phase of a 2-pole winding of coil-group sequence 6—6 per phase. Equally, it can represent a 10-pole winding of coil-group sequence:

1-1-2-1-1—1-1-2-1-1 per phase

In the former case, the slot-vectors 1, 2, 3, 4, 5, 6 of FIG. 1 correspond respectively to actual slot-numbers 1, 2, 3, 4, 5, 6 of the winding of FIG. 2A, which diagram shows the coil-group distribution for the complete 2-pole winding in 36 slots. Slot-vectors 1′, 2′, 3′, 4′, 5′, 6′ of FIG. 1 correspond respectively to actual slot-numbers (19), (20), (21), (22), (23), (24) of FIG. 2A. The bracketed slot-numbers indicate that the coils in these slots have negative winding sense. In the latter case, slot-vectors 1, 2, 3, 4, 5, 6 correspond respectively to actual slot-numbers 8, 1, (12), (5), 16, 9 of the winding of FIG. 2B which diagram shows the coil-group distribution for the complete 10-pole winding in 36 slots. Slot vectors 1′, 2′, 3′, 4′, 5′, 6′ correspond to actual slot numbers (26), (19), 30, 23, (34), (27) of FIG. 2B respectively.

It is desired to have 3 parallel circuits per phase; and ideally the induced E.M.F's. in the individual circuits should be equal in magnitude and cophasal. Referring again to FIG. 1, it will be seen that the twelve slot-vectors are symmetrically distributed about the vertical ($e^{j0°}$) axis which is taken as the reference axis. The angle between adjacent slot-vectors is (60/6°).

In Table 1, which forms a sheet of the accompanying drawings, there are given the component E.M.F.'s of the individual slot-vectors in the vertical and the horizontal axes; unit E.M.F. per slot-vector being assumed. The resultant E.M.F. of all twelve slot-vectors combined is 11.47372$e^{j0°}$; one-third of this resultant is 3.82457$e^{j0°}$.

By inspection, it can be seen that if the three circuits are formed, by joining in series coils which correspond to slot-vectors $$1, 3, 4, 6$$
$$2, 2', 4', 6'$$
$$1', 3', 5', 5$$

and
their resultant E.M.F.'s will be respectively, $$e^{-j25°}+e^{-j5°}+e^{j5°}+e^{j25°}=3.80500e^{j0°}$$
$$2e^{-j15}+e^{j5°}+e^{j25°}=3.8343e^{-j0.11°}$$

and $$e^{-j25°}+e^{-j5°}+2e^{j15°}=3.83436e^{j0.11°}$$

It is thus seen that there is a trivial difference in magnitude, as well as in phase, between the induced E.M.F.'s of the three circuits. These circuits may thus be satisfactorily connected in parallel. In terms of the actual coils to be joined in series, the three circuits of phase-winding A will be formed of coils which lie respectively in slot-numbers:

$$1, 3, 4, 6$$
$$2, (20), (22), (24)$$

and $$(19), (21), (23), 5 \text{ of FIG. 2A.}$$

Alternatively, as a 10-pole winding, the three circuits of phase winding A will be formed of coils which lie respectively in slot-numbers:

$$8, (12), (5), 9$$
$$1, (19), 23, (27)$$

and $$(26), 30, (34), 16 \text{ of FIG. 2B.}$$

Figure 3:
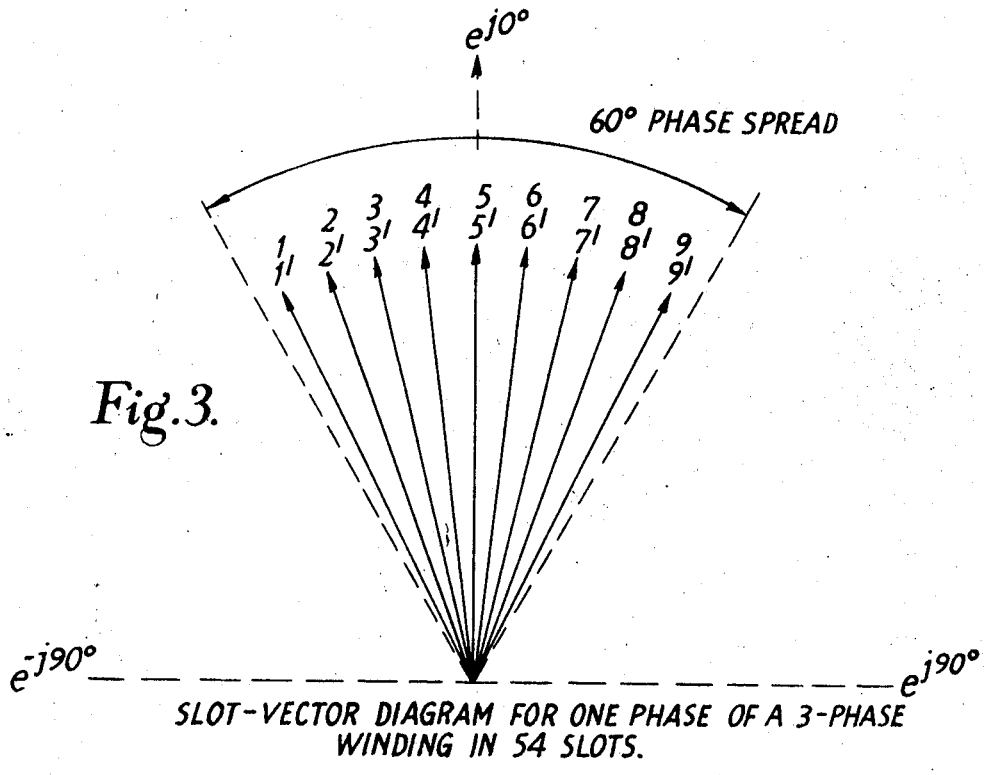
FIG. 3 is a slot-vector diagram for one phase of a three-phase winding wound in a 54 slot armature.

As another example of a 3-parallel-circuit winding, FIG. 3 shows the slot-vector diagram for one phase of a 3-phase winding in 54 slots. The angle between adjacent slot-vectors is (60/9°). Such a diagram can represent the slot-vector distribution per phase for a large number of windings of which the following are a few:

A 2-pole winding of coil-group sequence 9—9 per phase;
A 4-pole winding of coil-group sequence 4–5—4–5 per phase;
An 8-pole winding of coil-group sequence $$2–2–2–3—2–2–2–3 \text{ per phase}$$

A 10-pole winding of coil-group sequence $$1–2–2–2–2—1–2–2–2–2 \text{ per phase}$$

A 14-pole winding of coil-group sequence $$1–1–1–1–1–2–2—1–1–1–1–1–2–2 \text{ per phase}$$

Referring to FIG. 3, it will be seen that if the three circuits are formed by joining in series coils which correspond to slot-vectors:

$$1, 5, 7, 3', 5', 9'$$
$$2, 3, 4, 8, 9, 4'$$

and $$1', 2', 6', 7', 8', 6$$

their resultant E.M.F.'s will then be, respectively, $$e^{-j26\frac{2}{3}°}+e^{j0°}+e^{j13\frac{1}{3}°}+e^{-j13\frac{1}{3}°}+e^{j0°}+e^{j26\frac{2}{3}°}=5.73336e^{j0°}$$
$$e^{-j20°}+e^{-j13\frac{1}{3}°}+e^{-j6\frac{2}{3}°}+e^{j20°}+e^{j26\frac{2}{3}°}+e^{j6\frac{2}{3}°}$$
$$=5.73254e^{-j0.14°}$$

and $$e^{-j26\frac{2}{3}°}+e^{-j20°}+e^{j6\frac{2}{3}°}+e^{j13\frac{1}{3}°}+e^{j20°}+e^{j6\frac{2}{3}°}$$
$$=5.7325e^{j0.14°}$$

Again the difference between the induced E.M.F.'s of the three circuits is trivial both in magnitude and in phase; and parallel connection of these circuits is permissible.

It should be mentioned that correspondingly numbered slot-vectors, (1 and 1'; 2 and 2' etc.) are completely interchangeable, since they represent identical induced E.M.F.'s. The inclusion of interchangeable slot-vectors in the particular circuits will depend on practical considerations, that is, the way in which the parallel-circuits can most conveniently be formed in practice.

The next examples to be considered are four-parallel-circuit windings of the type M and the type PH, defined above.

It will be clear that the number of slots per phase for four parallel-circuit windings must be divisible by "4." Further, if the coil-group sequence for each phase-winding is twice repeatable, it will only be necessary to consider half of one phase. This is because, if it is possible to arrange to have two parallel circuits for each half of a phase-winding, the remaining half can then be connected in like manner to give two additional parallelable circuits.

Figure 4:
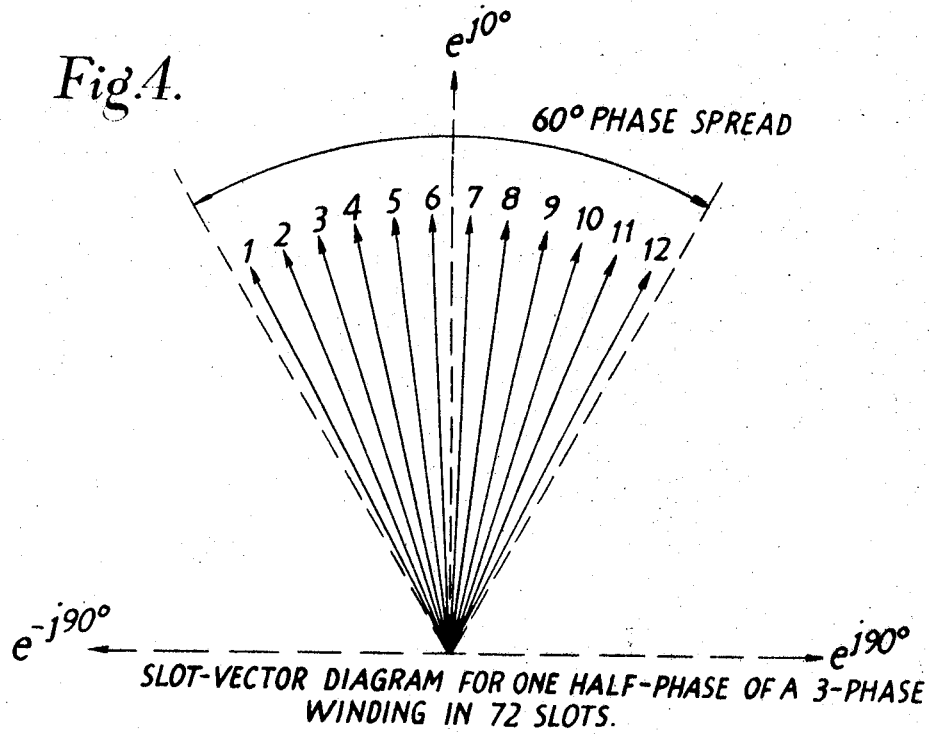
FIG. 4 is a slot-vector diagram for one half-phase of a three-phase winding wound in a 72 slot armature.

Considering first a four-parallel-circuit winding of non-triplen pole numbers:

In FIG. 4, there is shown the slot-vector diagram for one half-phase of a 3-phase winding in 72 slots. There are 12 slot-vectors numbered 1, 2, 3 . . . 12; the angle between adjacent slot-vectors being (60/12°). This diagram can represent the slot-vector distribution per phase for a large family of windings, for example:

A 2-pole winding of coil-group sequence 12—12 per phase;
A 10-pole winding of coil-group sequence $$2–2–2–2–3—2–2–2–2–3 \text{ per share}$$

A 14-pole winding of coil-group sequence $$1–1–2–2–2–2—1–1–2–2–2–2–2 \text{ per phase}$$

and so on.

If two circuits are formed, by joining in series the coils corresponding to slot-vectors $$1, 4, 6, 7, 9, 12;$$

and $$2, 3, 5, 8, 10, 11;$$

their induced E.M.F.'s will be, respectively:

$$e^{-j27.5°}+e^{-j12.5°}+e^{-j2.5}+e^{j2.5°}$$
$$+e^{j12.5°}+e^{j27.5°}=5.72472e^{j0°}$$

and $$e^{-j22.5°}+e^{-j17.5°}+e^{-7.5°}+e^{j7.5°}$$
$$+e^{j17.5°}+e^{j22.5°}=5.73808e^{j0°}$$

It will be observed that the induced E.M.F.'s of the two circuits of each half phase-winding are cophasal, but they are marginally different in magnitude (0.23%).

Alternatively, two circuits may be formed for each half phase-winding, by joining in series the coils corresponding to slot-vectors:

$$1, 3, 7, 8, 9, 11;$$

and $$2, 4, 5, 6, 10, 12;$$

their induced E.M.F.'s can be shown to be, respectively, $$5.73140e^{j0.11°} \text{ and } 5.73140e^{-j0.11°}$$

The two E.M.F.'s are identical in magnitude; but there is a marginal phase displacement (0.22°) between them. There is thus a small potential difference between the two circuits, which expressed as percentage of the individual induced E.M.F. is $$\frac{2 \sin 0.11°}{5.73140} \times 100 = 38\%$$

Parallel connection for both types of circuits (Type M and Type PH) is thus permissible.

Figure 5:
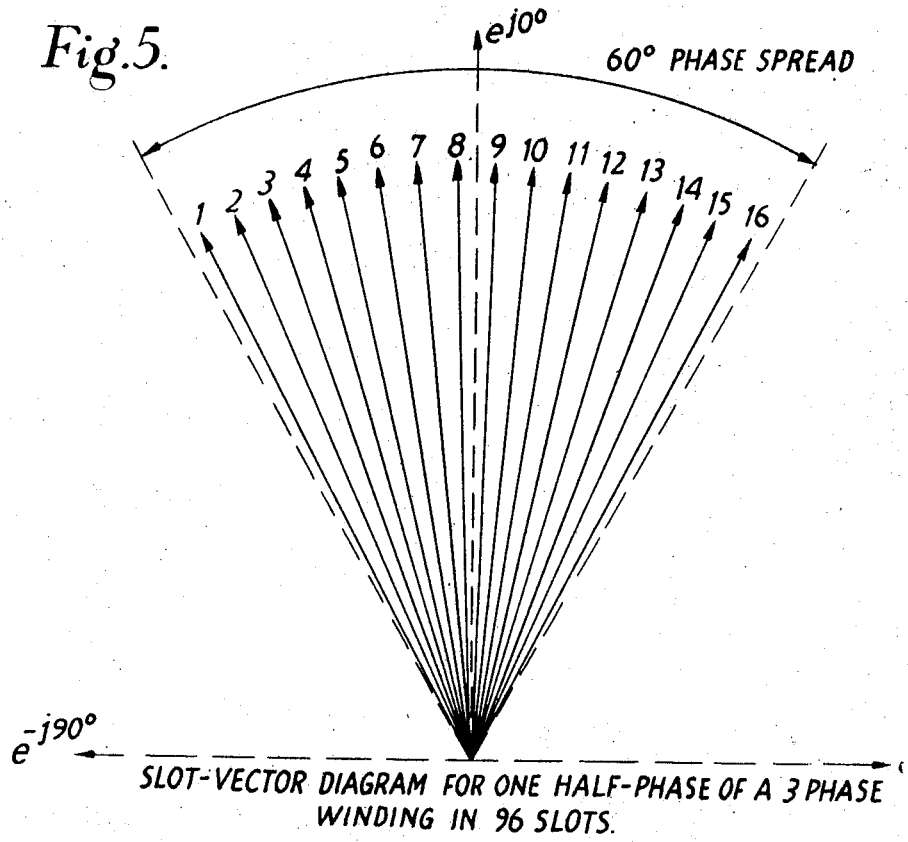
FIG. 5 is a slot-vector diagram for one half-phase of a three-phase winding wound in a 96 slot armature.

As another example of a 4 parallel-circuit winding, a 96-slot armature will be considered. In FIG. 5, there is shown the slot vector diagram for one half-phase of a 3-phase winding in 96 slots. There are 16 slot-vectors uniformly spread over 60° and numbered 1, 2, 3 . . . 16.

This diagram can represent the slot-vector distribution for a large number of windings, for example:

A 2-pole winding of coil group sequence 16—16 per phase;

A 10-pole winding of coil-group sequence 3-3-3-3-4—3-3-3-3-4 per phase

A 14-pole winding of coil-group sequence 2-2-2-2-2-3-3—2-2-2-2-2-3-3 per phase and so on.

Two circuits may be formed by joining in series coils corresponding to the slot-vectors:

1, 4, 6, 7, 10, 11, 13, 16;

and 2, 3, 5, 8, 9, 12, 14, 15 of FIG. 5.

The induced E.M.F.'s of these two circuits can be shown to be cophasal (Type M); their magnitudes being in the ratio 1.00011:1.

Considering, next, four-parallel circuit windings of triplen pole-numbers:

FIG. 6 shows the coil-group distribution for one half of an unorthodox 3-phase, 6-pole winding in 72 slots. The winding pattern of the second half is identical, but reversed in sign. It will be noted that the first phase band of FIG. 6 belongs to phase-winding B, but the phase band sequence is unaltered. This has been done for the purpose of showing that the coil-group sequence of phase-winding A is unique, being 3-6-3—3-6-3. The coil-group sequences for phase windings B and C are, respectively, 5-4-3—5-4-3 and 3-4-5—3-4-5

They are seen to be mirror image, each of the other, about the phase A axis. The slot-vector diagrams for one half of each of the three phase-windings are shown respectively in FIGS. 7A, 7B and 7C, where the numbers given refer to the actual slots in which the coils lie, and brackets signify a reversal of winding sense. The angle between adjacent slot-vectors is 15° (6π/72). This winding has, in fact, been specially designed to give a wider phase-spread, resulting in a small reduction in winding factor (2%) as compared with an orthodox winding.

There are again two ways in which two parallel-circuits per each half phase-winding can be arranged. The type M circuit will be considered first.

Figure 7A:
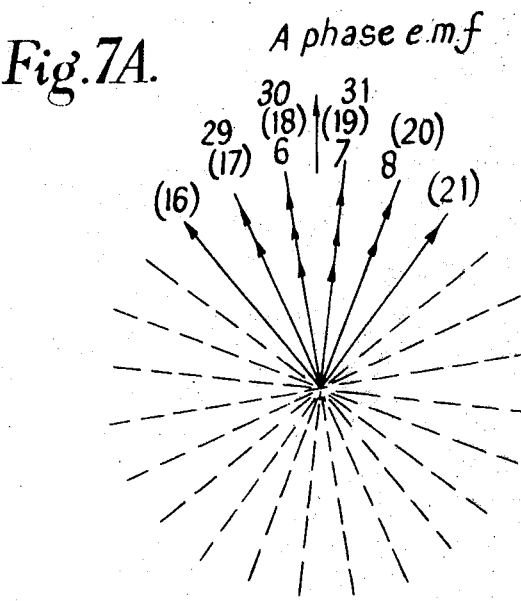
FIGS. 7A, 7B and 7C are the slot-vector diagrams for one half of each of the three phases, for example A, B and C respectively, of the three-phase winding of FIG. 6.
Figure 7B:
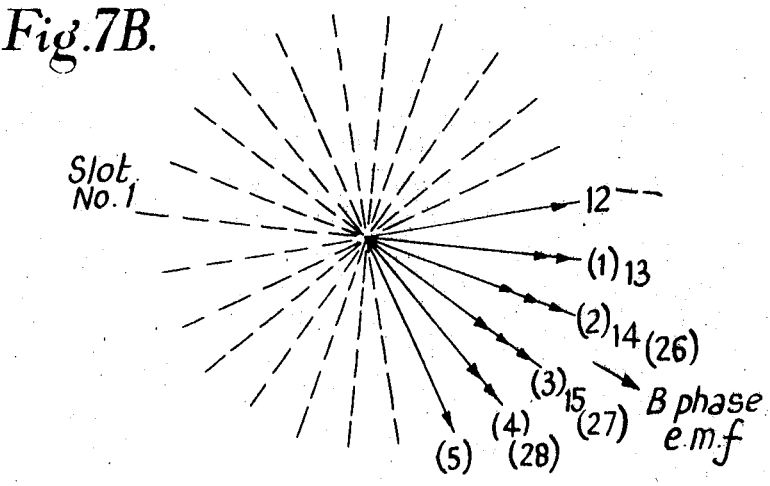
Figure 7C:
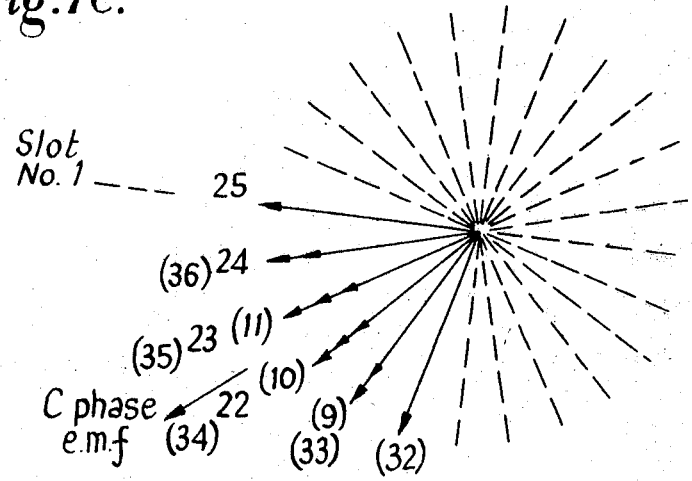

Referring to FIG. 7A, it will be seen that if two circuits are formed by joining in series the coils which lie in slot-numbers:

6, 7, (16), (21), 30, 31 and 8, (17), (18), (19), (20), 29 their induced E.M.F.'s can be shown to be $5.5524e^{j0°}$ and $5.67840e^{j0°}$ respectively i.e. in the ratio 1:1.0226. Parallel connection of the two circuits is thus permissible.

The corresponding circuits for the other two half-phases are formed by joining in series the coils which lie in slot-numbers:

(2), (3), (5), 12, 14, 15 and (1), (4), 13, (26), (27), (28) for phase B 22, 23, 25, (32), (34), (35)

and (9), (10), (11), 24, (33), (36) for phase C

The type PH circuit will next be considered.

Two circuits which may be connected in parallel can also be formed for each half-phase by joining in series the coils which lie in slot-numbers:

6, 7, 8, (16), (18), (20)

and (17), (19), (21), 29, 30, 31 for phase A (2), (4), 12, (26), (27), (28)

and (1), (3), (5), 13, 14, 15 for phase B 22, 23, 24, (32), (34), (36)

and (9), (10), (11), 25, (33), (35) for phase C

The induced E.M.F.'s for each pair of the above circuits will be found to be identical in magnitude (=5.61543), but slightly displaced (0.53°) from each other. The potential difference between the two circuits of each phase expressed as percentage of the individual induced E.M.F. is 0.93%.

Five-parallel-circuit windings, of type M will next be considered.

The number of slots per phase for such windings must be an integral multiple of "5."

Figure 8:
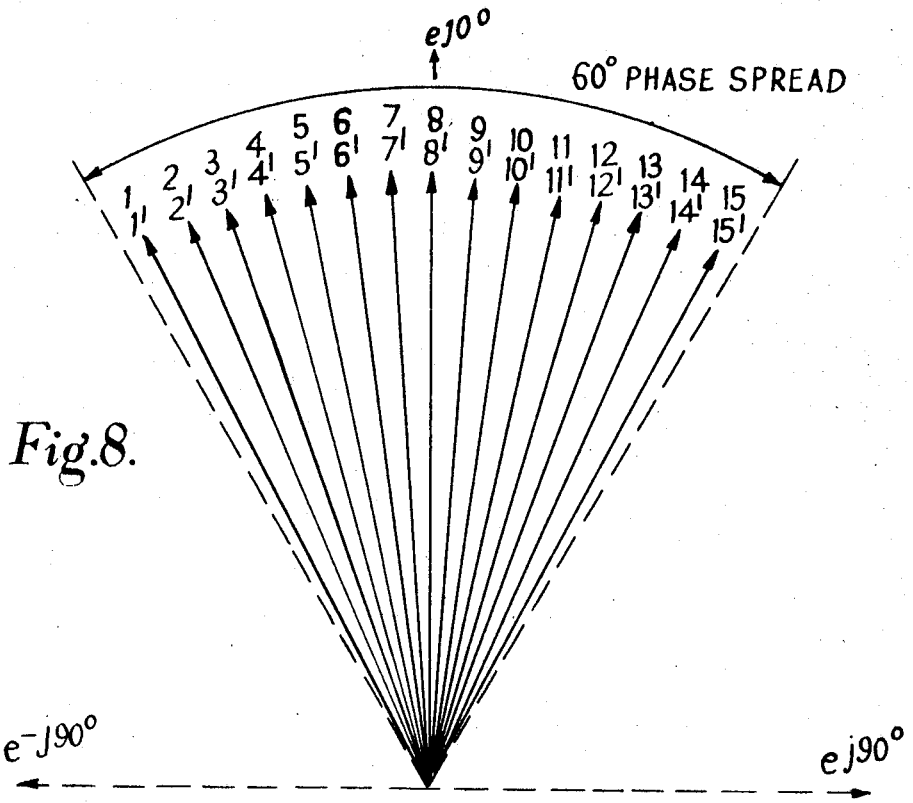
FIG. 8 is a slot-vector diagram for one phase of a three-phase winding wound in a 90 slot armature.

In FIG. 8, there is shown the slot-vector diagram for one phase of a 3-phase winding in 90 slots. There are 30 slot-vectors spread over 60° and numbered 1, 1′, 2, 2′, 3, 3′ . . . 15, 15′. The angle between adjacent slot-vectors is (60/15°).

This diagram can represent the slot-vector distribution per phase of a large number of windings, for example:

A 2-pole winding of coil-group sequence 15—15 per phase;

A 4-pole winding of coil-group sequence 7-8—7-8 per phase;

An 8-pole winding of coil group sequence 3-4-4-4—3-4-4-4 per phase;

A 14-pole winding of coil group sequence 2-2-2-2-2-2-3—2-2-2-2-2-2-3 per phase;

and so on.

If five circuits are formed by joining in series the coils corresponding to slot-vectors:

1, 4, 8, 12, 15, 8′
2, 6, 10, 14, 4′, 12′
5, 11, 2′, 5′, 11′, 14′
7, 9, 1′, 6′, 10′, 15′ and 3, 13, 3′, 7′, 9′, 13 the induced E.M.F.'s of these circuits will be cophasal and their magnitudes in the ratio

1:1.0074:1.0090:1.0093:1.0115

Six-parallel-circuit windings, of type MPH, will next be considered.

Clearly, if three parallel-circuits per phase are obtainable for a 2p-pole winding in a given number of slots, it will be possible to double the slot-number to give a 4p-pole winding with six parallel circuits per phase. For example, it has been shown that it is possible to arrange to have three parallel-circuits per phase for a 2-pole winding in 36 slots. The same winding twice repeated will give a 4-pole winding in 72 slots. Similarly, a 20-pole winding can be wound to give six parallel-circuits per phase in the same number of slots, that is 72 slots.

The slot-number of 90 slots, which has been chosen for an embodiment having five circuits per phase, can also be used for six-circuit windings. Since it is possible to form three-parallel-circuits with 15 coils the three circuits for each half-phase may be formed by joining in series coils corresponding to slot-vectors 1, 7, 8, 9, 15
2, 4, 10, 11, 13 and 3, 5, 6, 12, 14 of FIG. 8

The induced E.M.F.'s of these circuits will be found to be $4.76102e^{j0°}$; $4.78292e^{j0.08°}$; and $4.78292e^{-j0.08°}$ This arrangement results in marginal deviations, both in magnitude and in phase between the circuit E.M.F.'s and it will be clear that six-circuit windings per phase are possible for windings of 2 poles, 4 poles, 8 poles, 14 poles etc. in 90 slots.

Summarizing, it will be seen that the principle of multi-parallel circuits has been exemplified with reference to 3-, 4-, 5- and 6-parallel-circuits per phase, 3-phase double-layer windings, wound in a range of slot-numbers popular in practical usage. The principle is however quite general, and may be applied to single-phase and other poly-phase windings wound in slot-numbers other than those considered in the embodiments. A practical example may fall into the classification of one, or a combination, of the three types of circuits—Type M, Type PH and Type MPH.

In general, the performance of multi-parallel circuit windings will be found to be satisfactory, compared with standard windings, when the inequality in the induced E.M.F.'s of the individual circuits does not exceed 6% and indistinguishable from such standard windings when the value is 2.5% or less.

What is claimed is:

1. A method of constructing a winding for dynamo-electric machines providing a plurality of pole-pairs and having a plurality (A) of parallel circuits per phase comprising the following steps:

(1) Selecting a slotted armature having $S_a$ slots, where $$S_a = P \times A \times C$$

where

P=number of phases, and
C=number of coils per circuit;

(2) Winding the armature as a double layer winding throughout;
(3) Ascertaining for each coil the magnitude and relative phase angle of the induced EMF therein;
(4) Selecting each coil for series-parallel combinations subject to the following requirements:
  (i) Every coil is connected in one or another series-parallel combination;
  (ii) Every series-parallel combination comprises the same total number of coils, and further comprises the same number (A) of parallel circuits, each parallel circuit having the same number of series-connected coils;
  (iii) The expression $2p/A$ (where $2p$ is the pole-number of the machine) is not an integer;
  (iv) The vectorial resultants of induced EMF and phase angle, selected from relative phase angle and the opposite phase angle, of all series-connected coil combinations which are connected in parallel with each other differ by not more than 6%.

2. A method according to claim 1, in which, according to step (4), requirement (iv), the vectorial resultants of induced EMF and phase angle of all series-connected coil combinations which are connected in parallel with each other differ by not more than 2.5%.

3. A method according to claim 1, in which, according to step (4) and requirement (iv), coils are selected for connection to provide a plurality of series-connected coil combinations the induced EMF's across which are cophasal, but differ in amplitude one from another.

4. A method according to claim 1, in which, according to step (4) and requirement (iv), coils are selected for connection to provide a plurality of series-connected coil combinations the induced EMF's across which are equal in amplitude but differ in phase one from another.

5. A winding for dynamoelectric machines defined in that the winding:
  (a) provides a plurality of pole-pairs;
  (b) has a plurality (A) of parallel circuits per phase;
  (c) is wound on a armature having $S_a$ slots, where $$S_a = P \times A \times C$$

where

P=number of phases
A=number of parallel circuits per phase
C=number of coils per circuit;

(d) is wound as a double layer winding throughout;
  (e) is wound with uniform coil-pitch throughout; and
  (f) has every coil thereof connected in one or another series-parallel coil combination;
said winding further conforming to the following conditions:
  (i) every said series-parallel coil combinations has the same number of coils and the same number of parallel circuits;
  (ii) every said parallel circuit has the same number of coils serially connected together;
  (iii) the number obtained by dividing the pole-number of the machine by the number of parallel circuits of each said series-parallel coil combination is not an integer; and
  (iv) the vectorial resultants of induced EMF and phase angle, selected from relative phase angle and the opposite phase angle, of all series-connected coil combinations which are connected in parallel with each other differ by not more than 6%.

6. A winding for dynamoelectric machines as claimed in claim 5, comprising a three-phase winding having a phase-spread of 60°.

7. A winding for dynamoelectric machines as claimed in claim 5, having at least three parallel-connected circuits per phase.

8. A winding for dynamoelectric machines as claimed in claim 5, having at least two parallel-connected circuits for each half phase-winding.

References Cited

UNITED STATES PATENTS

| | | | |
|---|---|---|---|
| 1,447,164 | 2/1923 | Hague | 310—202 |
| 2,015,562 | 9/1935 | Kilgore | 310—202 |
| 2,408,219 | 9/1946 | Liwschitz | 310—202 |
| 2,778,962 | 1/1957 | Taylor | 310—202 |
| 2,778,963 | 1/1957 | Habermann | 310—202 |
| 3,152,273 | 10/1964 | Harrington | 310—198 |
| 3,201,627 | 8/1965 | Harrington | 310—198 |
| 3,408,517 | 10/1968 | Willyoung | 310—198 |

OTHER REFERENCES

"Induction Motors," C. S. Siskind, 1958, McGraw-Hill Book Co., New York and London, pp. 184–187.

WARREN E. RAY, Primary Examiner

U.S. Cl. X.R.

29—596; 310—202